July 30, 1929.    G. R. BOTT ET AL    1,722,491
ANTIFRICTION BEARING
Original Filed Nov. 5, 1923
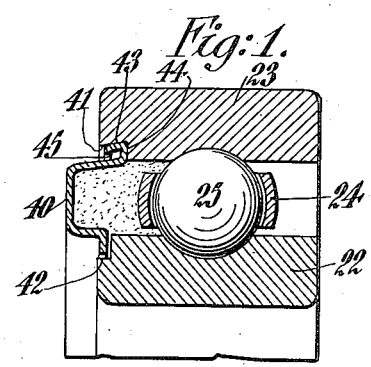
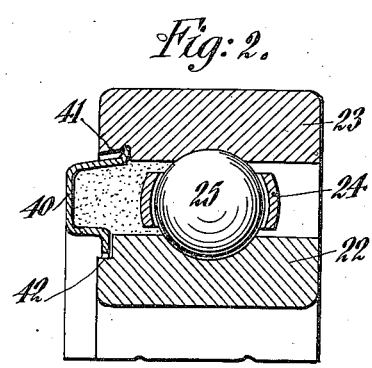
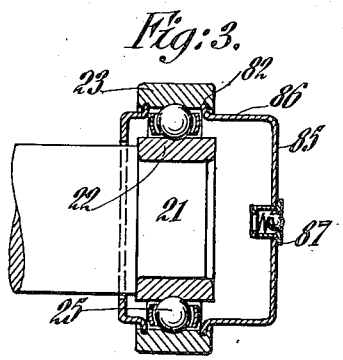
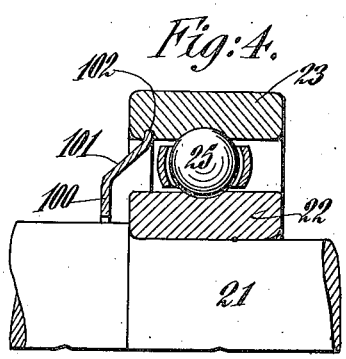
INVENTORS
George R. Bott
Frederick E. Mueller, Dec'd.
Katherine M. Mueller, EXECUTRIX.
BY C. P. Goepel
ATTORNEY Patented July 30, 1929.

1,722,491

UNITED STATES PATENT OFFICE.

GEORGE R. BOTT, OF STAMFORD, CONNECTICUT, AND FREDERICK E. MUELLER, DECEASED, LATE OF MOUNT VERNON, NEW YORK, BY KATHERINE M. MUELLER, EXECUTRIX, OF MOUNT VERNON, NEW YORK, ASSIGNORS TO NORMA-HOFFMANN BEARINGS CORPORATION, OF STAMFORD, CONNECTICUT, A CORPORATION OF NEW YORK.

ANTIFRICTION BEARING.

Original application filed November 5, 1923, Serial No. 672,728. Divided and this application filed July 1, 1926. Serial No. 119,815.

This invention relates to anti-friction bearings, and more particularly to a lubricant packed bearing of the type shown and described in the pending application for patent filed by George R. Bott and Frederick E. Mueller, on November 5, 1923, Serial No. 672,728, and of which this application is a division.

As in the said original application, it is the purpose of the invention to provide a simple and efficient means whereby ball or roller bearings when assembled at the place of manufacture, may be packed with a suitable lubricating grease by the application of grease holding or retaining means at one or both sides of the bearing in cooperative relation with one of the bearing race rings to retain the lubricant between said rings and in intimate contact with the balls or rollers and the cage in which the latter may be mounted.

Heretofore, in the manufacture of such bearings it has been customary to furnish to the user the inner and outer race rings with the cage and balls or rollers therein assembled between said rings. The purchaser installed these bearings and then provided separate or additional means for supplying lubricant thereto. Thus, lubrication of the bearings was a secondary problem depending upon the design of the housing which was arranged to take care of the lubricant and to exclude such foreign materials as dirt, grit, dust, etc., which of course, seriously affected the efficient operation of the bearings and eventually caused such wear as to preclude their continued use.

In order to overcome the above disadvantages, we propose to attach to either the inner or outer race ring of the bearing a dust excluding and lubricant retaining means which, when attached, is in close proximity to the other bearing ring but not in contact therewith and also out of contacting relation with the cage or the bearing balls. Preferably, this lubricant retaining and dust excluding means is attached to the outer race ring and is provided with a pocket which in effect constitutes a continuation of the space between the inner and outer rings and enlarges the capacity of said space for the reception of lubricant. During the operation of the bearing, there is a tendency, due to centrifugal action, to throw the grease outwardly against the outer race ring, and in order to prevent the escape of the lubricant, we provide the lubricant retaining means in the form of a resilient metal plate having a barrier flange provided with an outwardly turned or bent edge adapted to be snapped into a groove formed in the inner face of the outer race ring in resilient interlocking engagement with the walls thereof to thereby produce a substantially leak-proof joint. In this manner, we effectually confine the body of lubricating grease and prevent the leakage or escape thereof, and at the same time also preclude the possibility of the entrance of dust or grit between the bearing rings.

With the above and other objects in view, the invention consists in the improved anti-friction bearing and in the form, construction and manner of arrangement of the several parts as will be hereinafter more fully described, illustrated in the accompanying drawings, and subsequently incorporated in the subjoined claims.

In the drawings, wherein we have illustrated several simple and practical embodiments of the invention, and in which similar reference characters designate corresponding parts throughout the several views,—

Figure 1 is a sectional view showing a ball bearing provided with the present invention arranged in operative relation with a shaft and bearing housing;

Fig. 2 is a fragmentary sectional view through the bearing showing a slightly modified form of the device;

Fig. 3 is a similar section showing the lubricant retaining means applied to both sides of the bearing, and Fig. 4 is a sectional view showing still another modified embodiment of the device.

Referring in detail to the drawings, and more particularly to Fig. 1 thereof, the ball bearing provided with the improved lubricant retaining and dust excluding means is adapted to be mounted as a unit within a suitably formed support 20 which may consist merely of one end of a machine casing having a bearing receiving opening therethrough or provided with an integrally formed housing for the bearing to receive the end of the shaft 21. The inner race ring 22 of the bearing is fitted upon this shaft to rotate therewith while the outer race ring 23 snugly fits within the opening of the support 20. The cage 24 with the bearing balls 25 is arranged between these inner and outer rings and the balls positioned in the races thereof. We have herein shown a conventional closed type ball bearing, but it will become evident as this description proceeds that the essential features of the invention are also applicable to open type bearings as well and of various constructions commonly known in the art.

The outer bearing ring 24 at the juncture of one of its side faces with the inner face thereof is provided with an annular groove 41 having a radially extending base wall 44 and an obliquely inclined or beveled outer wall 43. In other words, this groove gradually decreases in depth inwardly from the side face of the race ring.

The inner race ring 22 of the bearing is likewise provided at its outer side and in the corresponding lateral face thereof with an annular rabbet or groove 42.

The lubricant retaining and dust excluding member generally indicated at 40 is in the form of a stamped or die pressed resilient sheet metal plate of annular or ring-like shape. This retaining member is of channel shape cross sectional form having a narrow inner wall 46 and a relatively wide outer wall 47, the edge of which is outwardly bent or turned to form the bead 45 thereon. The outer wall 46 is provided with an inwardly projecting annular flange 48 at its edge.

It will be noted that the outer wall 47 of this channel shaped retaining member is outwardly inclined from the intermediate connecting section of the plate between said inner and outer walls, the space between said walls forming a lubricant receiving or holding pocket as indicated at 49.

In the application of the lubricant retainer, after the bearing balls and cage have been assembled between the inner and outer race rings, the space between these rings at one side of the cage is filled with lubricating grease of proper consistency, such grease being also packed into the pocket 49 of the retaining member 40. This member is now applied under pressure sufficient to force the inclined outer wall of said member inwardly from its normal position so that the bead 45 on the edge thereof may be engaged in the outer side of the groove 41 in the race ring 23. As the retaining member is pressed inwardly, said outer wall thereof snaps outwardly by the inherent resiliency of the metal against the undercut or inclined wall of said groove and against the base wall 44 thereof, thus effecting a tight frictional interlocking connection between said race ring and the wall of the retaining member so that the latter will be securely held in its applied position to prevent the lubricating grease from exuding outwardly between the outer wall of the member 40 and the race ring. The inwardly projecting flange 49 on the inner wall of the member 40 is positioned in the rabbet or groove 42 of the inner bearing ring 44 but out of contact with the walls of said groove so that said retaining member offers no resistance whatever to the free rotation of the inner bearing.

In Fig. 2 of the drawings, we show a slightly different construction wherein the inclined wall 43' of the annular groove in the outer ring 23 has a slight depression or channel cut therein as shown at 43ª at the base or inner side of said groove. In this case, the outer wall of the retaining member 40 is not provided with a cylindrical bead as above referred to but is formed with a slightly out turned rim or flange 45'. In forcing the member 40 to its applied position, this flange rides on the inclined wall 43' and finally snaps outwardly into the shallow groove 43ª. This construction likewise will provide a secure interlocking connection between the retaining member and the inner race ring.

In Fig. 3 of the drawings we have shown the lubricant retaining members applied to each side of the bearing. Each of these members may obviously be of the annular channel shaped form above described, but in the illustrated embodiment we have shown one of said members designated at 85 in the form of a relatively deep cap which extends over and encloses the end of the shaft 21 at one side of the bearing. The annular wall 86 of this cap has its end edge angularly offset in an outward direction and is adapted to be resiliently or expansibly fitted into the annular groove 82 in the face of the outer race ring 23. This cap may be provided with any suitable type of spring seated valve indicated at 87 through which lubricant may be forced so that the original supply of lubricant contained within said cup may be replenished when necessary.

In Fig. 4 another alternative construction is illustrated wherein the retaining member 100 is in the form of a shallow dished resilient metal plate having a radial inner portion and an angled or inclined outer section 101, the outward inclination of which with respect to the plane of said inner portion is appreciably greater than in the construction shown in Figs. 1 and 2. The edge of this outer angled part 101 of the retaining plate is slightly turned outwardly or flanged to snap into a relatively narrow groove 102 formed in the inner face of the outer race ring 23 in spaced relation to the lateral side face thereof, said groove in this instance being closed at its opposite sides. It will also be observed that in this construction the inner radial portion of the retaining ring or plate 100 when applied is disposed in spaced parallel relation to the side face of the inner bearing ring 22, said lubricant retaining member being of such internal diameter as to provide the necessary clearance with respect to the periphery of the shaft 21.

From the foregoing description, it will be seen that any one of the several constructions referred to will provide a grease packed bearing of high efficiency which enables the bearing manufacturer to furnish such bearings fully equipped with an adequate supply of lubricant, the retaining means effectively preventing the escape of the lubricant and also protecting the bearing against wear due to the entrance of dust and grit upon the relatively moving parts thereof.

By thus providing means whereby the bearings may be supplied with the essential parts thereof practically enveloped in a lubricating grease from the time they are assembled until put into use by the purchaser, during this interim, the bearing parts will be protected against accumulations of dust and dirt and moisture, resulting in corrosion, so that when the said bearings are applied in use, they will operate at their originally calculated efficiency.

In the foregoing description and accompanying drawing, several practical alternative embodiments of the invention are disclosed. Nevertheless, it is possible that the essential features thereof may be exemplified in still other alternative structural forms, and accordingly the privilege is reserved of resorting to all such legitimate changes in the construction and relative arrangement of the several elements as may be fairly embodied within the spirit and scope of the invention as claimed.

We claim:

1. In combination with a ball or roller bearing having an inner and an outer race ring, annular grooves in the inner surface of the outer race ring at both sides of the balls or rollers, a shaft for the said ball or roller bearing, and means secured in said grooves and provided with means for holding a lubricant, one of said means extending over the end of the shaft.

2. A ball or roller bearing comprising inner and outer rings and anti-friction bearing members arranged between said rings, and a lubricant holding cup having an annular resilient wall, said outer bearing ring and said cup wall being provided with coacting means thereon held in fluid tight interlocking engagement by the inherent resiliency of said cup wall, and said lubricant holding cup adapted to extend over and receive the end of a shaft mounted in the inner bearing ring.

3. A ball or roller bearing, comprising inner and outer rings and anti-friction bearing members arranged between said rings, and a lubricant holding cup having an annual wall extending laterally from the outer bearing ring and connected at its edges with said ring by a fluid tight joint, said lubricant holding cup being adapted to receive and completely enclose the end of a shaft mounted in the inner bearing ring.

4. In a grease packed bearing unit, inner and outer rings and anti-friction bearing members arranged between said rings, said outer ring having an annular groove in its inner face adjacent one edge thereof, a stamped sheet metal member having angularly related walls forming a pocket to receive and confine a body of grease against one side of said bearing members, one wall of said sheet metal member having an edge outwardly flanged from the open side of the pocket and said wall resiliently yieldable with respect to the other wall of said member whereby said flange may be engaged in the annular groove of the outer bearing ring to establish a fluid tight joint therewith and retain said member in assembled relation with the ring and in laterally projecting relation to one edge face thereof.

5. In a grease packed bearing unit, inner and outer rings and anti-friction bearing members arranged between said rings, two stamped sheet metal members each having angularly related walls to form a grease receiving pocket, said outer bearing ring and one of the walls of each of said sheet metal members having coacting means forming fluid tight joints between said members and the outer bearing ring at the opposite sides of said anti-friction bearing members and retaining said parts in assembled relation with said sheet metal grease retaining members in laterally projecting relation to the opposite edge faces of the bearing ring.

In testimony that we claim the foregoing as the invention of GEORGE R. BOTT and FREDERICK E. MUELLER, deceased, we have signed our names hereto.

GEORGE R. BOTT.
KATHERINE M. MUELLER,
*Executrix of the Last Will and Testament of Frederick E. Mueller, Deceased.*